July 23, 1963  R. E. FOX  3,098,331
SHARPENER ATTACHMENT FOR GASOLINE ENGINES
Filed Sept. 28, 1956  3 Sheets-Sheet 1
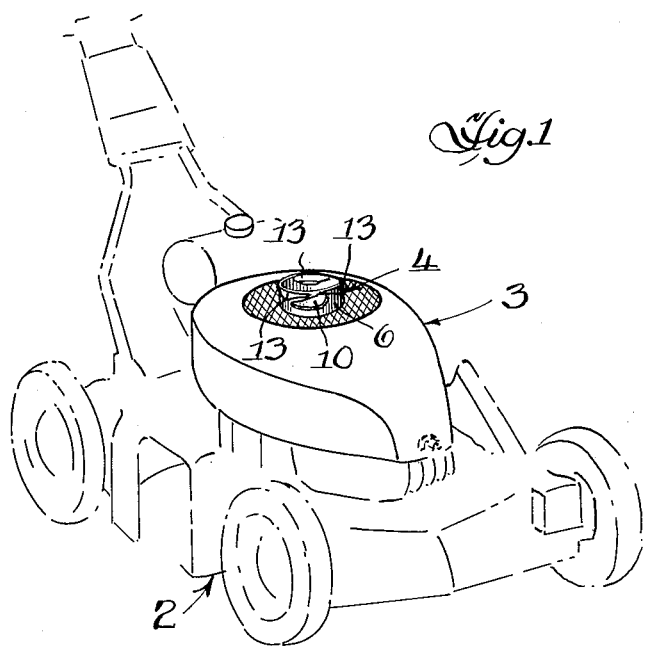
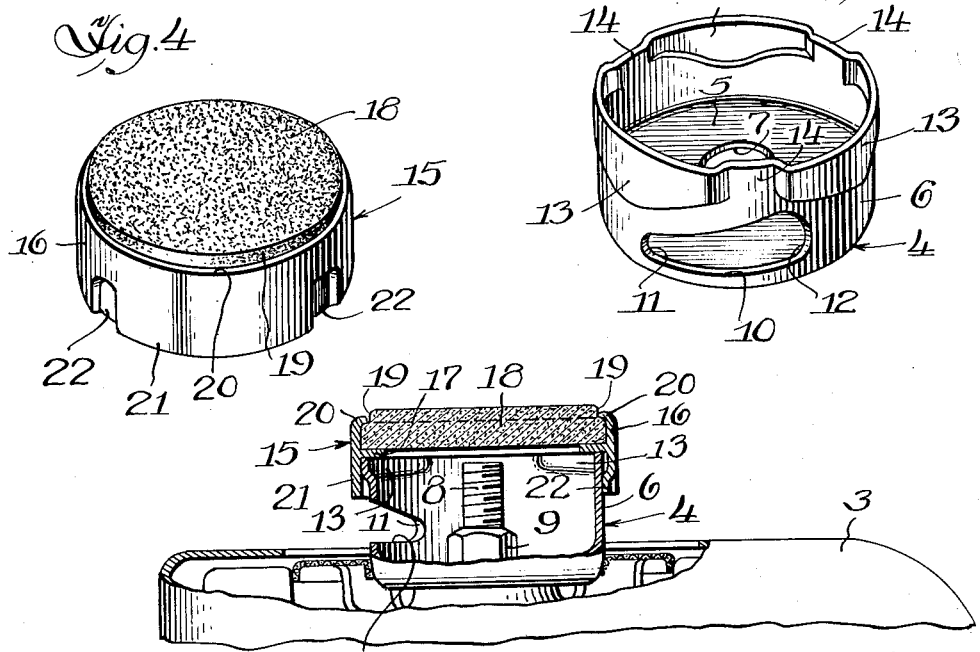
Inventor,
Richard E. Fox,
By: Schneider, Dressler & Goldsmith,
Attys.

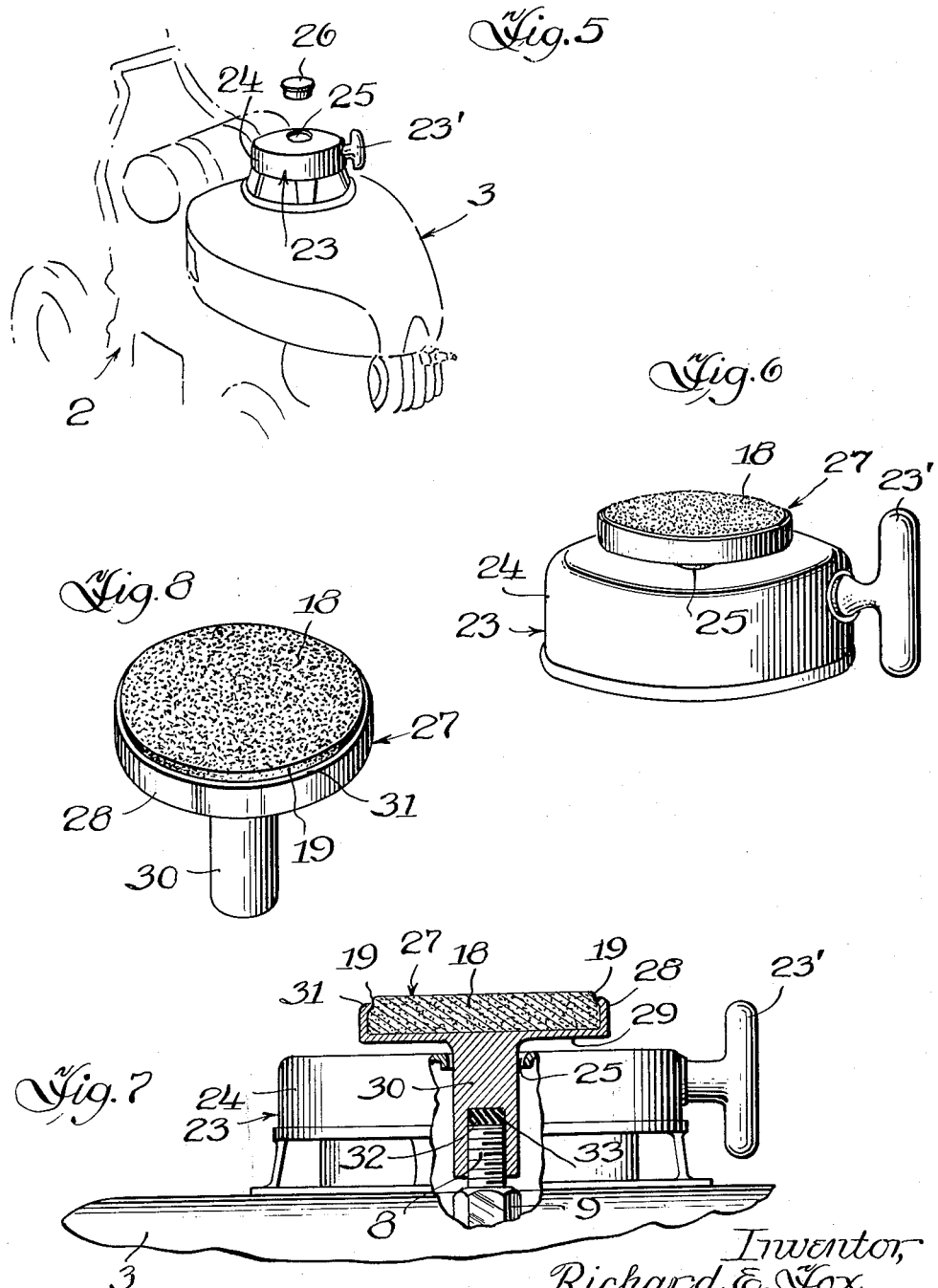

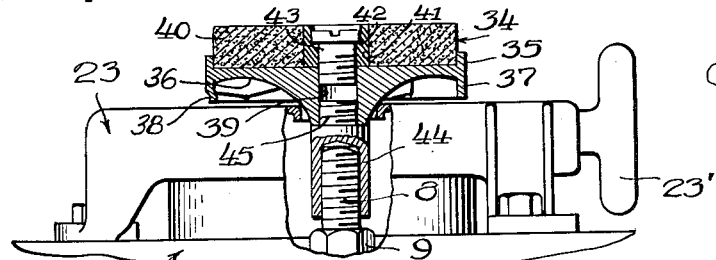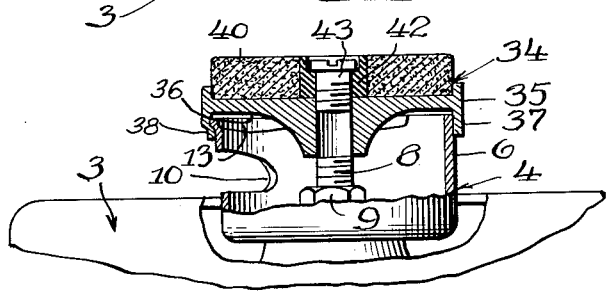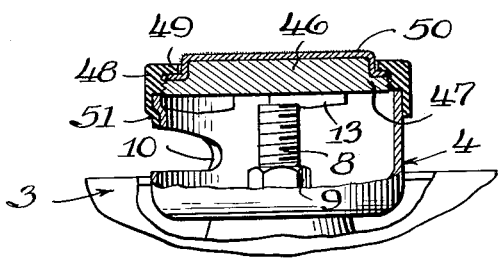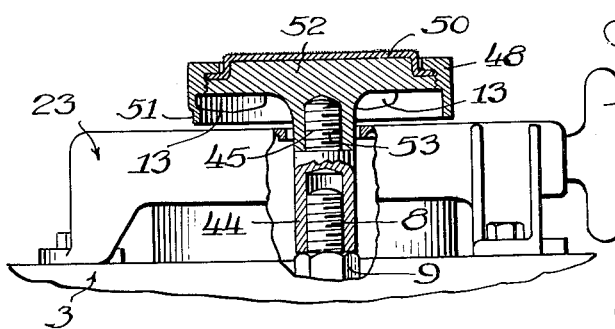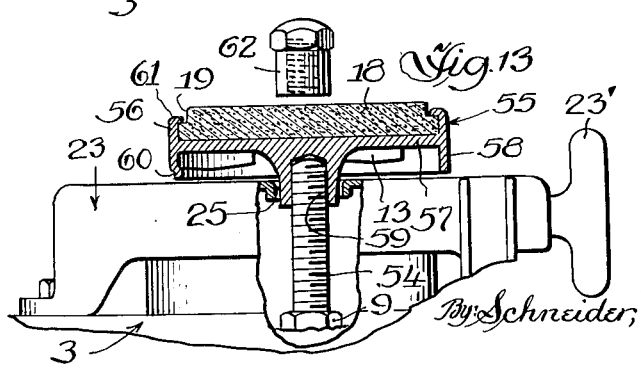

3,098,331
SHARPENER ATTACHMENT FOR GASOLINE ENGINES
Richard E. Fox, Northbrook, Ill., assignor, by mesne assignments, to Midwest Mower Corporation, St. Louis, Mo., a corporation of Missouri
Filed Sept. 28, 1956, Ser. No. 612,749
5 Claims. (Cl. 51—241)

This invention relates to a sharpener for cutting blades of power lawn mowers, and is particularly concerned with a grinding unit and means for detachably securing it to the gasoline engine of a power lawn mower whereby it may be rotated by operation of the engine.

The grinding unit is primarily intended for sharpening the cutting blades of a power lawn mower, but may also be used for sharpening any tool that can be held against its grinding surface.

If the cutting blades of a lawn mower become dull during a mowing operation, it is inconvenient for the user to stop and send the lawn mower to a shop to get the cutting blades sharpened. Such inconvenience is eliminated by the present invention which permits the user to remove the dull blades of a power mower, attach the grinding unit to the gasoline engine, and sharpen the blades without substantial loss of time. The grinding unit may be kept attached to the gasoline engine, if desired, but it is preferred to detach it when not being used, in order to protect it from accidental damage.

Gasoline engines for power lawn mowers are usually provided with a vertical power shaft having cutting blades mounted on its lower end. The engine of a power lawn mower is started by rotating the power shaft either by a recoil starter, or by a rope starter. In the case of a recoil starter, the starter applies force directly to the shaft to rotate it, while in the case of a rope starter, a starter cup is mounted on the shaft, and the starter cup is rotated by a knotted rope extending through an opening in the vertical wall of the starter cup. The grinding unit of the present invention is designed for detachable securement either to the rotatable power shaft or to the starter cup.

The grinding unit comprises a metal frame comprising a cylindrical vertical wall and a horizontal seat upon which a grinding stone is seated. The horizontal seat may comprise a solid bottom, or may comprise an annular flange extending inwardly from the vertical wall. The grinding stone is in the form of a disc having its grinding surface on its upper face which must lie in a plane above the upper edge of the vertical wall of the frame. The stone may be secured to the frame by spinning the upper edge of the vertical wall downwardly and inwardly into a peripheral recess provided in the upper surface of the grinding stone or may be secured by means of a countersunk screw threaded into a vertical bore provided in the bottom of frame.

If the grinding unit is to be secured to the power shaft its frame is provided with a solid bottom. The solid bottom is preferably provided with a threaded aperture for engaging an adapter secured to the power shaft, but may have a centrally disposed stem depending from the bottom. The depending stem is provided at its bottom with a threaded vertical bore adapted to fit on the upper end of the power shaft which is also threaded. A gasket of rubber or other suitable material may be positioned in the recess to engage the upper end of the power shaft. The upper end of the power shaft is accessible in engines having a rope starter, but in the case of a recoil starter the housing is provided with an opening through which the adapter or the depending stem of the grinding unit may be inserted to engage the top of the power shaft.

The power shaft may be extended upwardly to project above the top of the recoil starter and may be covered by a removable cap. The threads at the upper end of the power shaft 8 are reversed relative to the direction of rotation of the shaft, so that the rotation of the shaft by the engine will not loosen the attachment of the adapter or of the grinding unit to the shaft.

The frame of the grinding unit adapted to be secured to the starter cup is provided with an inwardly extending flange adapted to seat on the upper edge of the starter cup. The starter cup has a bottom wall apertured to fit around the power shaft, and an upstanding cylindrical wall having an opening through which the knotted end of a rope is inserted. The knotted end of a rope is easily inserted through the larger end of the opening and is moved to the smaller end before it is pulled to start the engine. The knotted end of the rope is easily released from the larger end of the opening after the rope has been pulled to start the engine. The cylindrical wall of the starter cup is provided with a series of cams extending around its periphery in a general horizontal direction just below its upper edge.

The frame of the grinding unit for use with a rope starter has a cylindrical vertical wall provided with a depending skirt having inwardly extending bosses adapted to fit under the cams to hold the grinding unit in place. The cams may be shaped symmetrically so that the bosses may be engaged with either end of the cam to hold the grinding unit in place. The grinding unit may be loosely placed on the starter cup and the pull of the starter cup to start the engine will automatically cause the cams of the starter cup to engage the bosses to the grinding unit frame.

Preferably the frame of the grinding unit is provided with means for securing the grinding unit selectively to either the power shaft of the engine, or the starter cup of the rope starter. Thus the bottom of the horizontal seat of the frame is provided with a vertical bore threaded to engage either the upper end of the power shaft or the upper end of a removable adapter, which is threaded at its lower end to engage the upper end of the shaft to secure the grinding unit to the power shaft, and the lower portion of the cylindrical vertical wall is provided with inwardly extending bosses adapted to engage the cams of the starter cup to secure the grinding unit to the starter cup.

After the sharpening operation, the grinding unit is detached, and the lawn mower is operated in conventional manner. The grinding unit may be left in place on the engine, but it is preferred to remove it after the grinding operation to avoid any possibility of accidental damage to the grinding unit.

The structure by means of which the above mentioned and other advantages of the invention are attained will be described in the following specification, taken in conjunction with the accompanying drawings, showing two preferred illustrative embodiments of the invention, in which:

FIGURE 1 is a perspective view of a gasoline engine mounted on a lawn mower and having a rope starter, with a starter cup designed to hold a blade sharpener embodying the invention;

FIG. 2 is a fragmentary view, partly in elevation and partly in section showing the blade sharpener secured to the starter cup of the gasoline engine;

FIG. 3 is a detail perspective view of the starter cup;

FIG. 4 is a detail perspective view of one embodiment of the grinding unit adapted to be secured to a starter cup;

FIG. 5 is a view, similar to FIG. 1, showing an engine having a recoil starter with the closure removed to expose an opening for providing access to the top end of the power shaft of the engine;

FIG. 6 is a fragmentary perspective view showing the grinding unit attached to the engine having a recoil starter;

FIG. 7 is a view, partly in elevation and partly in section, showing the grinding unit provided with a stem in engagement with the top end of the power shaft of the engine;

FIG. 8 is a detail perspective view of the grinding unit adapted to be secured to the power shaft of a gasoline engine;

FIG. 9 is a fragmentary view, partly in elevation and partly in section, showing a grinding unit secured to the power shaft of an engine and provided with bosses to adapt it to be secured to a starter cup;

FIG. 10 is a fragmentary view, partly in elevation and partly in section, showing the grinding unit of FIG. 9 secured to a starter cup;

FIG. 11 is a fragmentary view, partly in elevation and partly in section, showing another embodiment of the grinding unit secured to a starter cup;

FIG. 12 is a fragmentary view, partly in elevation and partly in section, showing another grinding unit secured to the power shaft of an engine;

FIG. 13 is a fragmentary view, partly in elevation and partly in section, showing a grinding unit secured directly to a power shaft extending above the starter, and a removable cap to be secured on the shaft when the grinding unit is removed; and FIG. 14 is a fragmentary cross sectional view showing another embodiment of a grinding unit in which the grinding stone has an angularly disposed grinding surface.

In the drawings, the reference numeral 2 indicates a lawn mower powered by a gasoline engine 3. The lawn mower and engine are conventional, except for the construction of the starter cup, and therefore, will not be specifically described. The starter cup 4 comprises a bottom wall 5 and an upstanding cylindrical wall 6. Bottom wall 5 is apertured, as indicated at 7, to fit around the power shaft 8. A nut 9 is threaded on the top end of shaft 8 and tightened against the upper surface of bottom wall 5 to hold the starter cup rigidly in place so that it will rotate with shaft 8 when the engine is operating.

Starter cup 4 is provided with an opening 10 in its upstanding cylindrical wall 6 for reception of a knotted rope (not shown) used for starting the engine. One end of the opening 10 is comparatively narrow, as indicated at 11, and the opposite end 12 is comparatively large. The knotted end of the rope is inserted through the large end 12 of opening 10 and is then moved toward the end 11 until the knot is firmly held by the portions of the cylindrical wall 6 defining the narrow end 11 of the opening. A quick pull on the free end of the rope turns the starter cup and the power shaft to start the engine. As the engine starts, the shaft 8 rotates the starter cup 4, and the rope, which is held by hand, immediately moves from end 11 to end 12. Continued rotation of the starter cup causes the knotted end of the rope to be released from opening 10.

The starter cup has a series of cams 13 extending in a general horizontal direction along the upper edge portion of wall 6. Cams 13 are symmetrical, and the ends are spaced from the adjacent ends of the other cams to provide a gap 14 between adjacent cams. The cams are embossed outwardly to make the cam risers extend outwardly at right angles to wall 6.

The grinding unit 15, which is adapted to be detachably secured to starter cup 4, comprises a metal frame having a cylindrical vertical wall 16 provided with an inwardly extending annular flange 17 upon which a grinding stone 18 is seated. The grinding stone 18 is in the form of a disc fitting within cylindrical wall 16 and having a peripheral recess 19 in its upper surface. The upper edge of wall 16 is spun downwardly, as indicated at 20, to engage the recess and hold the grinding stone firmly between flange 17 and the turned down edge 20 of the frame, with the grinding surface of stone 18 extending above the edge 20 of the frame.

Wall 16 has a cylindrical skirt 21 depending below flange 17 and engageable with the outer side wall surfaces of cams 13. The lower edge portion of skirt 21 is provided with inwardly extending bosses 22 which are spaced the same as gaps 14. When the grinding unit is to be attached to starter cup 4 it is positioned above the cup with bosses 22 aligned vertically with gaps 14. It should be noted that the spacing of bosses 22 corresponds to the circumferential spacing of the gaps 14. The grinding unit is then dropped until flange 17 rests on the upper edge of wall 6, the bosses passing through gaps 14. As shown in FIG. 2, the lower edge of skirt 21 terminates adjacent the upper edge of opening 10, so that the grinding unit will not interfere with the normal operation of the starter. Rotation of the grinding unit relative to the starter cup causes the bosses to ride on the risers of cams 13 until the grinding unit is tightly secured in place. The grinding unit is rotated in the direction opposite the direction of rotation of the starter cup, so that subsequent rotation of the starter cup and grinding unit by the rotation of power shaft 8 will not loosen the grinding unit from the starter cup.

The cutting blades of the lawn mower may be sharpened by holding them against the grinding surface of stone 18 as the engine of the lawn mower rotates power shaft 8 to which starter cup 4 is rigidly secured. When the blades have been sharpened, the grinding unit is manually rotated relative to the starter cup to realign the bosses 22 with the gaps 14, so that it may be removed therefrom. After the blades have been re-attached to the lawn mower, it is again ready to cut grass.

In FIG. 5 the gasoline engine 3 mounted on the lawn mower 2 has a recoil starter 23 enclosed in a housing 24. A handle 23' for the starter projects out of one wall of the housing. The housing is provided with an opening 25 aligned vertically with power shaft 8. A detachable closure cap 26 is provided for opening 25. The cap 26 is removed when the grinding unit 27 is to be secured to the engine.

The grinding unit 27 comprises a cylindrical metal frame 28 provided with a solid bottom wall 29 and a centrally disposed stem 30 depending from the bottom wall. The grinding stone 18 fits within frame 28 which has its upper edge 31 spun downwardly into the peripheral recess 19 in the same manner as the upper edge 20 of frame 16 of FIGS. 1 to 4. As in the previous embodiment, the grinding surface of grinding stone 18 extends above the upper edge of the frame.

Stem 30 is provided with a vertical bore 32 extending upwardly from its bottom and threaded to fit on the top threaded portion of shaft 8. A rubber gasket 33 is preferably positioned in bore 32 to engage the top of power shaft 8 and prevent the grinding unit from being threaded too far on to the shaft 8. It should be noted that the grinding unit 27 may be secured to the shaft 8 in the engine having a rope starter as well as in the engine having a recoil starter.

When the stem 30 of frame 28 is engaged with shaft 8, rotation of the shaft by the engine 3 rotates the grinding stone upon which the blades of the lawn mower may be sharpened.

The grinding unit 34, shown in FIGS. 9 and 10, comprises a metal frame having a cylindrical vertical wall 35, a bottom 36, and a cylindrical skirt 37 depending below the outer edge of bottom 36. The skirt 37 is provided with inwardly extending bosses 38 adapted to engage cams 13 on a starter cup 4 to secure the grinding unit to a starter cup. The bottom 36 is provided with a threaded vertical bore 39. The grinding stone 40 is seated on bottom 36 and is provided with a central opening 41 having a lead bushing 42 fitted therein. A screw 43 countersunk in bushing 42 secures the grinding stone 40 to bottom 36.

In FIG. 9 a removable adapter 44 is threaded on the top of power shaft 8. The adapter has a threaded stud 45 extending vertically upwardly therefrom, and the grinding unit 34 is threaded on stud 45 to secure it to the power shaft 8. The shaft 8 and stud 45 are both threaded in the opposite direction to the direction of rotation of the shaft, so that neither the adapter nor the grinding unit can become loosened by the normal rotation of the shaft.

In FIG. 10 the grinding unit is merely dropped over the starter cup 4, and then turned to cause the bosses 38 to engage the cams 13 to hold the grinding unit securely in place. The skirt 37 does not extend below opening 10 in the cylindrical wall of starter cup 4 and does not interfere with the normal use of the starter.

The grinding stone in FIG. 11 comprises a metal disc 46 having a laterally extending flange 47. The peripheral edge of flange 47 is threaded to fit the threaded inner surface of a ring 48 having an inwardly extending flange 49 adapted to overlie flange 47. A sheet 50 of emery cloth or similar material is positioned over the upper face of disc 46 with its edges clamped between flanges 47 and 49. The lower portion of ring 48 is provided with bosses 51 to engage cams 13 for securing the grinding unit to the starter cup 4.

The embodiment of grinding stone shown in FIG. 12 is similar to that of FIG. 11 except that the metal disc 52 has a threaded vertical bore 53 extending upwardly from its bottom. Bore 53 is threaded on a stud 45 projecting upward from an adapter 44 which is threaded on the upper end of shaft 8. This embodiment has bosses 51 on the skirt of its ring 48 so that it may be secured to a starter cup 4 in the same manner as shown in FIG. 11.

In FIG. 13 the power shaft 54 extends above the top of starter 23. The grinding unit 55 comprises a cylindrical vertical wall 56 having a solid bottom 57 and a skirt 58 depending below the bottom. Bottom 57 has a threaded vertical bore 59 adapted to be threaded on the power shaft 54. Skirt 58 has bosses 60 adapted to engage cams 13 to secure the grinding unit to a starter cup. A grinding stone 18 is seated on bottom 57 and is secured in place by spinning the upper edge of wall 56 into its recess 19, as indicated at 61. A removable cap 62 is adapted to be threaded on shaft 54 when the grinding unit 55 is removed. Cap 62 protects the top of the shaft and the starter mechanism from the weather.

The structure of the grinding unit shown in FIG. 14 is essentially the same as that shown in FIG. 13 except for the shape of the grinding stone. The grinding stone 63 has an annular flange 64 adapted to be engaged by the spun edge 61 of the vertical wall 56 and a central portion 65 connected to flange 64 by an angularly extending portion 66 which is adapted to provide an angular grinding surface.

From the foregoing it will be seen that I have devised a convenient means for sharpening the cutting blades of a power lawn mower that may be readily attached to the lawn mower or removed therefrom. The sharpening means is to be operated by the power regularly used on the mower so that no extra source of power is required.

Although I have described several preferred embodiments of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. In an engine starter, a starter cup having a cylindrical wall, said wall having an opening confined entirely within the area of said wall for receiving one end of a rope by means of which said starter cup may be rotated.

2. In an engine starter, a starter cup having a cylindrical wall provided with an opening contained entirely within the area of said wall, said opening having one small end for receiving the knotted end of a rope for manually rotating said cup, and an enlarged end for releasing said rope after said cup has been rotated to start said engine.

3. In an engine starter, a starter cup having a cylindrical wall, said wall having an opening confined entirely within the area of said wall for receiving one end of a rope by means of which said starter cup may be rotated, a grinding unit comprising a frame and a grinding stone fixed in said frame, and complementary locking means on said starter cup and said frame whereby said grinding unit is detachably secured to said starter cup.

4. In combination, a starter cup for a gasoline engine and a grinding unit, said engine having a vertical power shaft, said starter cup having a bottom wall apertured to fit over said vertical power shaft, and an upstanding cylindrical wall, said grinding unit comprising a frame and a grinding stone rigidly secured in said frame, said frame having a cylindrical skirt depending below said grinding stone, and complementary locking means on said upstanding cylindrical wall and said depending cylindrical skirt to secure said grinding unit to said starter cup.

5. In combination, a starter cup for a gasoline engine and a grinding unit, said engine having a rotatable power shaft, said starter cup having a bottom wall apertured to fit over said rotatable power shaft and an upstanding cylindrical wall, said grinding unit comprising a frame and a grinding stone rigidly secured in said frame, said frame having a cylindrical skirt depending below said grinding stone, a cam on said upstanding cylindrical wall, and a boss on said depending cylindrical skirt, said boss being engageable with said cam to hold said grinding unit fixed relative to said starter cup.

References Cited in the file of this patent

UNITED STATES PATENTS

| | | |
|---|---|---|
| 114,265 | Clark | May 2, 1871 |
| 774,612 | Stead | Nov. 8, 1904 |
| 962,731 | Beasley | June 28, 1910 |
| 1,129,427 | Salisbury | Feb. 23, 1915 |
| 1,222,032 | Robison | Apr. 10, 1917 |
| 1,582,664 | Bennington | Apr. 27, 1926 |
| 2,098,147 | Hussmann | Nov. 2, 1937 |
| 2,348,547 | Kissel | May 9, 1944 |
| 2,386,703 | McElmurray | Oct. 9, 1945 |
| 2,597,325 | Hodges | May 20, 1952 |
| 2,731,007 | Benson | Jan. 17, 1956 |
| 2,735,247 | Holzhausen et al. | Feb. 21, 1956 |
| 2,790,292 | Trecker | Apr. 30, 1957 |
| 2,924,918 | Fox | Feb. 16, 1960 |

FOREIGN PATENTS

| | | |
|---|---|---|
| 76,878 | Denmark | Dec. 21, 1953 |